(12) United States Patent
Fisher

(10) Patent No.: US 8,015,897 B2
(45) Date of Patent: Sep. 13, 2011

(54) VIBRATION DAMPER

(75) Inventor: Douglas Dean Fisher, Huntington Beach, CA (US)

(73) Assignee: Unorthodox Racing, Inc., Deer Park, NY (US)

( * ) Notice: Subject to any disclaimer, the term of this patent is extended or adjusted under 35 U.S.C. 154(b) by 294 days.

(21) Appl. No.: 11/525,311

(22) Filed: Sep. 22, 2006

(65) Prior Publication Data
US 2008/0076611 A1    Mar. 27, 2008

(51) Int. Cl.
*F16F 15/12*    (2006.01)
*F16C 15/00*    (2006.01)
(52) U.S. Cl. ...................... 74/574.4; 74/572.2
(58) Field of Classification Search .................. 74/574.4, 74/574.2, 574.3, 573.12, 572.2; 464/180, 464/89
See application file for complete search history.

(56) References Cited

U.S. PATENT DOCUMENTS

| | | | | | |
|---|---|---|---|---|---|
| 2,594,555 | A | * | 4/1952 | Hardy | 74/574.4 |
| 2,622,419 | A | * | 12/1952 | McIntyre | 464/71 |
| 3,401,511 | A | * | 9/1968 | Weakly et al. | 56/296 |
| 4,044,627 | A | * | 8/1977 | Zander | 74/573.12 |
| 4,680,984 | A | * | 7/1987 | Wahling et al. | 74/574.4 |
| 5,341,780 | A | | 8/1994 | Rau et al. | |
| 5,386,894 | A | * | 2/1995 | Barca | 188/379 |
| 2004/0231629 | A1 | * | 11/2004 | Linnig | 123/192.1 |

\* cited by examiner

*Primary Examiner* — Richard W Ridley
*Assistant Examiner* — Daniel Yabut
(74) *Attorney, Agent, or Firm* — Tutunjian & Bitetto, P.C.

(57) ABSTRACT

A damper for shafts includes an elastomeric ring having a plurality of holes therethrough and an inertia ring having two portions such that the portions encapsulate the elastomeric ring and secure the elastomeric ring in a position. The inertia ring includes openings corresponding to the plurality of holes in the elastomeric ring. A first housing portion configured to receive first fasteners through a first set of openings in the elastomeric ring and the inertia ring to secure the first housing portion to a second housing portion. The first and second housing portions form a surface to receive an inner portion of the elastomeric ring such that the inertia ring floats on the elastomeric ring without the inertia ring contacting the first and second housing portions.

20 Claims, 8 Drawing Sheets

VIBRATION DAMPER

BACKGROUND

1. Technical Field

The present invention relates to vibration reduction and dampening and more particularly to an apparatus for dampening vibration of rotating shafts.

2. Description of the Related Art

A damper reduces the amplitude of vibration of a system. The vibration can be torsional or orbital. In piston driven automotive applications a crankshaft will twist back and forth at a very high frequency while it is rotating in its proper motion. This motion can lead to unexplained engine noise and vibration. In the past torsional dampers have been employed to reduce this high frequency twisting vibration.

Conventional crankshaft dampers reduce the amplitude and frequency of crankshaft vibrations. Excessive vibrations of a crankshaft can cause the crankshaft to fail and in many cases break. In other cases, the reduction of vibration amplitudes can reduce the noise and discomfort that a driver or passenger feels or hears, and is not limited to steering wheels, windows and accessories.

Referring to FIG. 1, in conventional torsion vibration control devices, such as in a conventional crankshaft damper 4, which employs natural rubber to function as a shock absorber. These designs adhere or bond a rubber material 6 between two metal portions. The first metal portion includes a hub 7 which supports the shaft. Another metal portion 8 is used as inertia and can support a pulley for ancillary equipment.

In this configuration, torsional 3 and linear motions 5 of a shaft (placed in the hub 6) cause a shearing stress in the rubber material. These shearing stresses cause the rubber to tear or delaminate from the metal.

Modern conditions for crankshaft dampers include unusually high rotations per minute, extreme heat and ozone exposure all of which can further contribute to the degradation of the rubber. Under these conditions the rubber's life expectancy and performance are significantly reduced.

In addition, rubber products were most commonly employed in a shear capacity to dampen only torsional or twisting motion. Conventional crankshaft designs were not capable of adequately damping fore and aft or orbital motions of the crankshaft. Further, due to the material properties of rubber, response lag for dampening vibrations was often inadequate especially in these high performance applications.

Therefore, a need exists for a damper design that provides vibration control in all directions as well as faster response times and greater orbital flexibility. A further need exists for a damping system that provides longer life and better damping capabilities. A still further need exists for a damper which can easily be serviced such that the damper material can be changed without having to replace all the metal parts.

SUMMARY

A damper for shafts includes an elastomeric ring having a plurality of holes therethrough and an inertia ring having two portions such that the portions encapsulate the elastomeric ring and secure the elastomeric ring in a position. The inertia ring includes openings corresponding to the plurality of holes in the elastomeric ring. A first housing portion configured to receive first fasteners through a first set of openings in the elastomeric ring and the inertia ring to secure the first housing portion to a second housing portion. The first and second housing portions form a surface to receive an inner portion of the elastomeric ring such that the inertia ring floats on the elastomeric ring without the inertia ring contacting the first and second housing portions.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Present embodiments include a damping device having an elastomeric ring disposed within an inertia ring. The elastomeric ring is encapsulated by two halves or portions of the inertia ring. The elastomeric ring floats within a casing or housing on an elastomeric ring. Deflections, vibrations and noise of a shaft are damped by the elastomeric ring and inertia ring in all directions using the system as a damped mass-spring system.

Advantageously, shaft motion vibrations through a center of the device are damped in all directions including torsional, radial, longitudinal and orbital deflections/vibrations. Further, the elastomeric material may include modern polyurethane or the like, which does not suffer from the drawbacks of using natural rubber and is replaceable without discarding the entire damper.

It should be understood that the present embodiments are directed to a crankshaft damping system; however, embodiments within the scope of the present claims include any shaft damping system, or any other damping system. Fasteners as used throughout this disclosure may include bolts, rivets, welds, solderings or any other acceptable fastening devices or process. The FIGS. show bolts for securing parts of the assemblies herein; however any other fastening device or system may be substituted within the scope of the present principles. In addition, housing/casing configurations, inertia ring configurations, etc. may be modified to have a different appearance, which are considered to be within the scope of the present claims.

Figure 1:
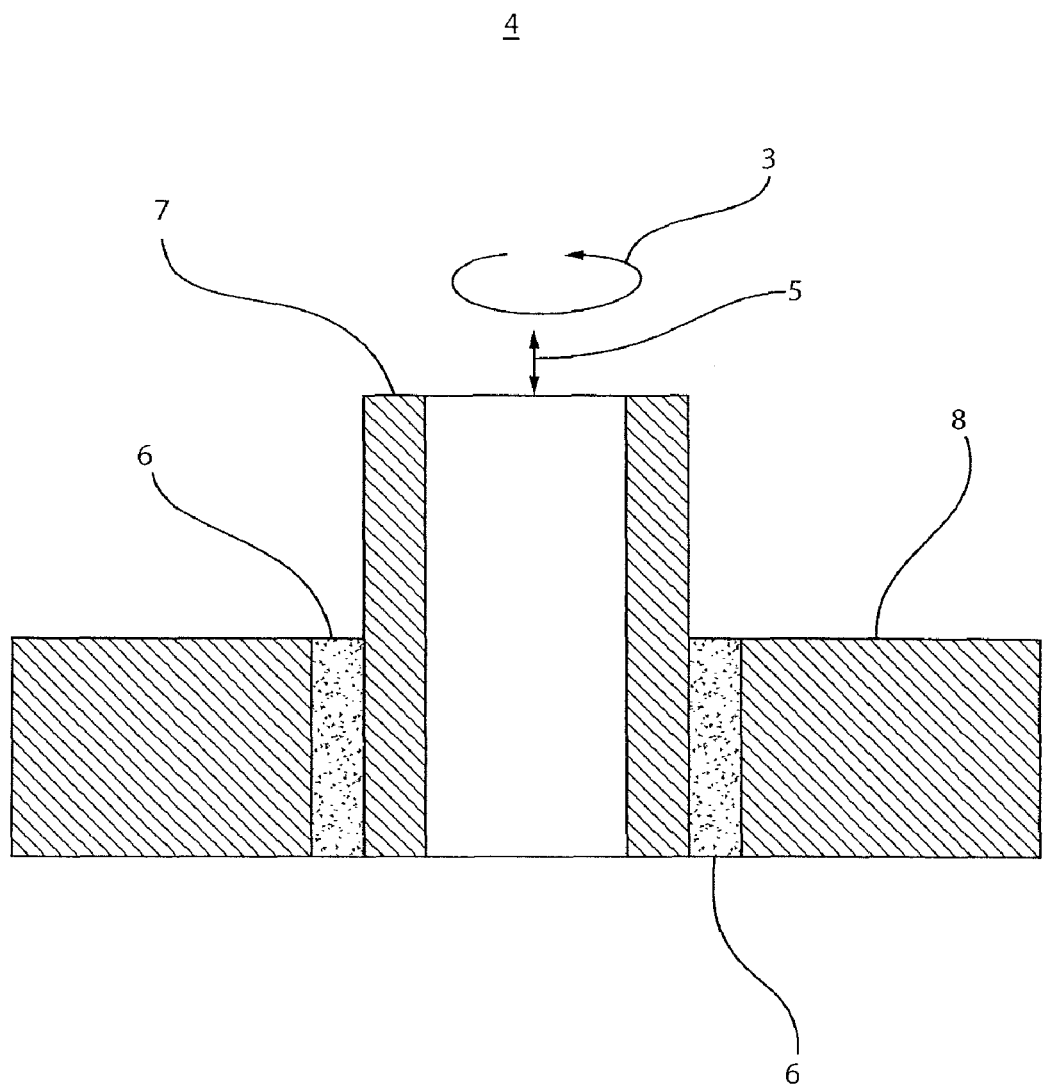
FIG. 1 is a schematic diagram showing a conventional crankshaft damper design using bonded rubber.
Figure 2:
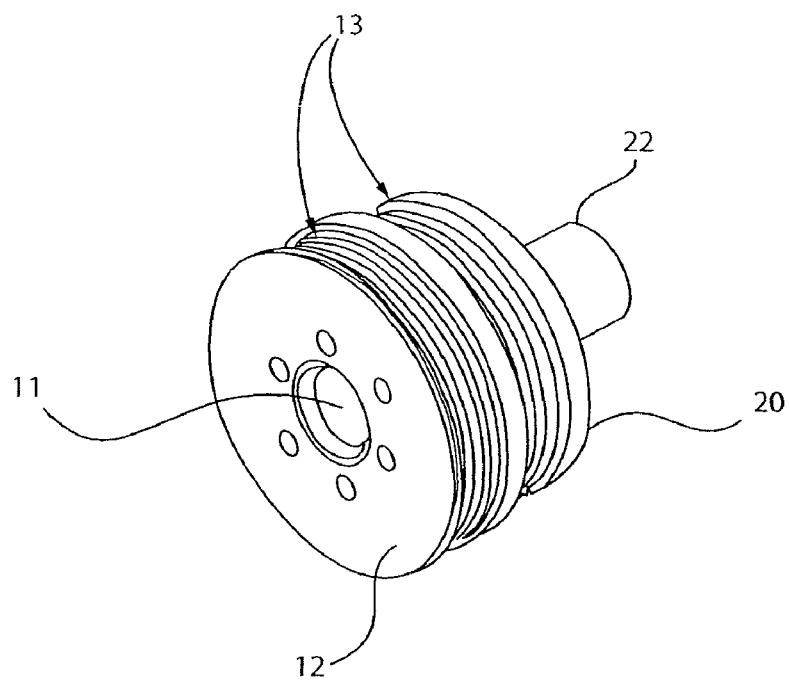
FIG. 2 is a perspective view of an illustrative damper in accordance with the present principles.

Referring now to the drawings in which like numerals represent the same or similar elements and initially to FIG. 2, an isometric view of a damper 10 is illustratively shown.

Damper 10 includes a center hole 11 configured to receive a shaft (not shown) for which motions of the shaft will be damped. An outside diameter 13 of the damper is configured to receive a pulley belt (not shown). The damper 10 rotates with the shaft.

Figure 3:
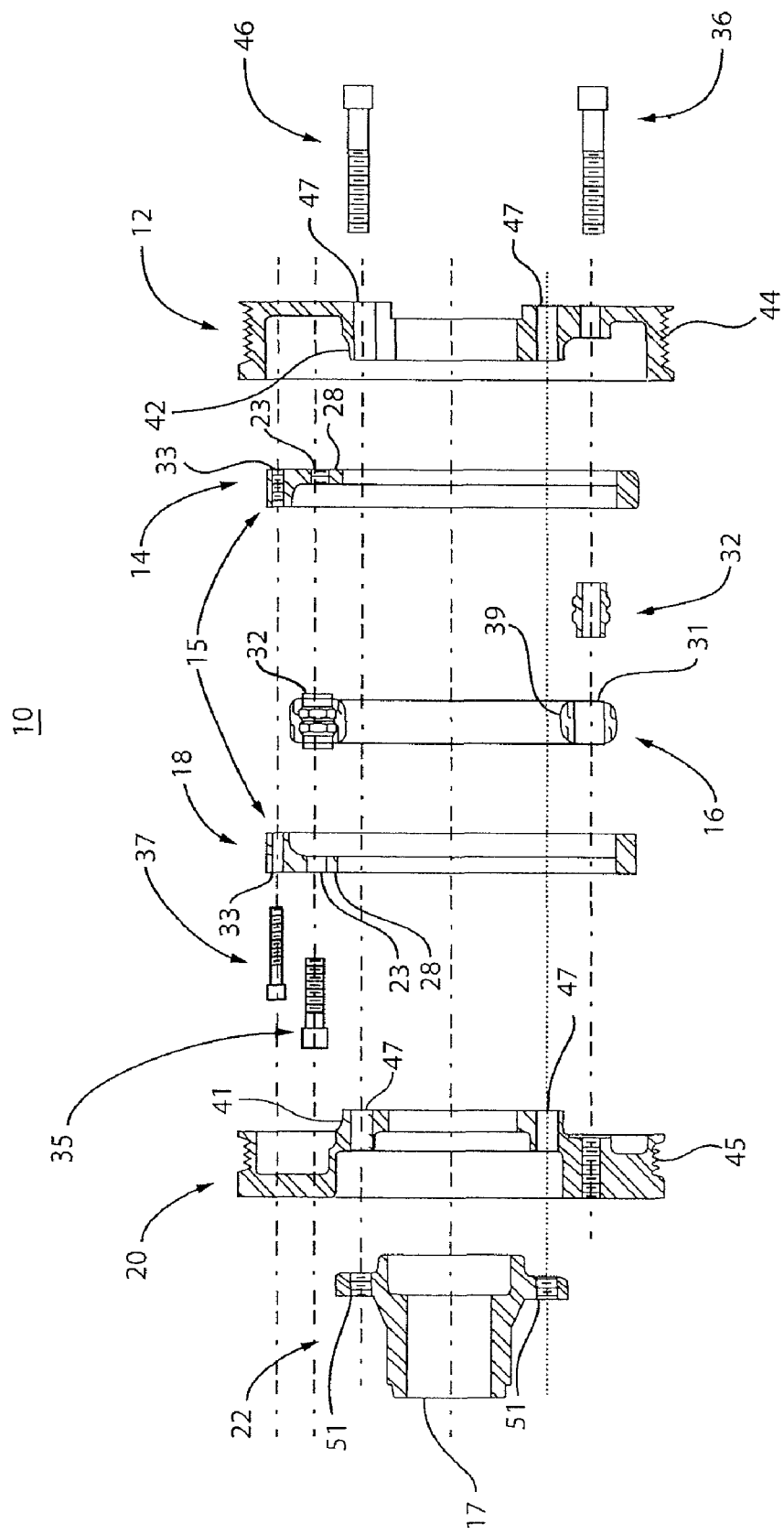
FIG. 3 is an exploded cross-sectional view of the damper of FIG. 2.
Figure 4:
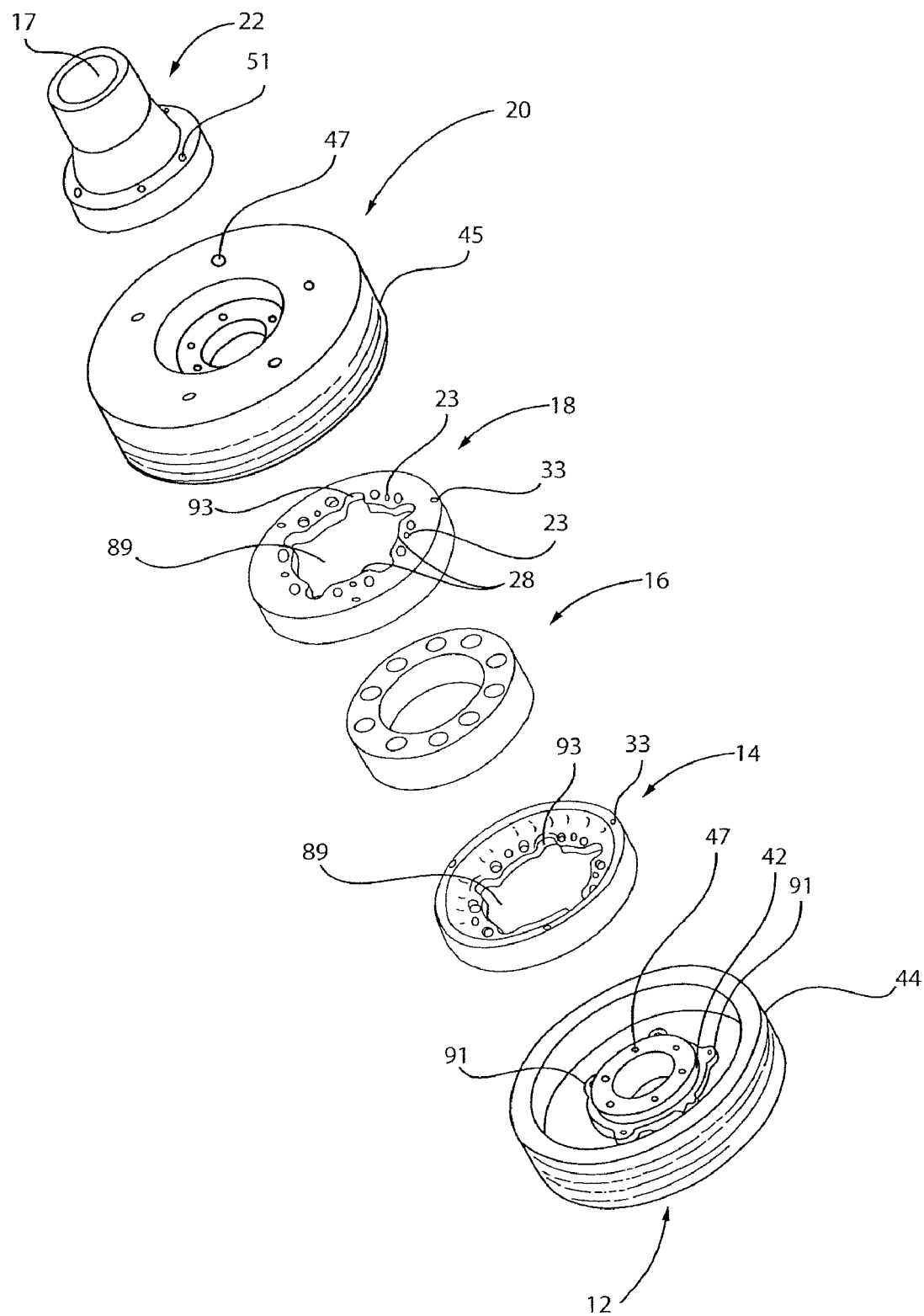
FIG. 4 is an exploded perspective view of the damper of FIG. 2.

Referring to FIGS. 3 and 4, an exploded side view of a damper 10 in accordance with an illustrative embodiment is shown in FIG. 3, while a perspective exploded view is shown in FIG. 4. A front face of a housing or casing 12 (hereinafter front face) makes up a first portion of a housing for the damper 10. A rear face of a housing or casing 20 (hereinafter rear face) includes a second portion of the housing for the damper 10. Deflections (vibrations) of a shaft (not shown) to the rear face 20 and the front face 12 will be dampened in all directions using an elastomeric ring 16.

Elastomeric ring 16 preferably includes a polyurethane material which may be molded with a plurality of openings 31 therein. Other materials may also be employed. These openings 31 may be employed to receive stand-offs 32 or other devices (e.g., grommets, etc.). Stand-offs 32 are adapted to receive fasteners 35 and 36 (such as, e.g., bolts, rivets or the like) therethrough. Stand-offs 32 permit clearance for through bolts 35 and 36 and distribute stress over a larger area of the elastomer material of the ring 16 in the case of a large deflection. Stand-offs 32 provide a stand-off against the two portions of an inertia ring 15. A compressions preload on the ring may be provided before stand-offs 32 are encountered (contacted) when joining the halves of the inertia ring 15.

The inertia ring 15 includes two portions 14 and 18. Portions 14 and 18 are connected to each other using fasteners such as bolts 37, through holes 33. The two portions 14 and 18 of inertia ring 15 encapsulate an outer portion of the ring 16. Ring 16 is secured to the inertia ring 15 by bolts 35 through a first set of even spaced fastener holes 23 through an extension plate 28 of the portions 14 and 18. In one embodiment, extension plate 28 of one of portions 14 and 18 may be countersunk for a bolt head while the other of portions 14 and 18 is threaded to receive the threaded portion of the bolt 35. In this way, e.g., in 5 places, ring 16 is bolted through a first set of stand-offs 32 to inertia ring 15. Portions 14 and 18 are further secured by bolts 37 in several places (preferable evenly spaced about the circumference).

Ring 16 further includes another set of stand-offs 32. One set of even-spaced stand-offs 32 is employed to receive bolts 36 to bolt the front face 12 to the rear face 20. Bolts 36 pass through the stand-offs 32 in ring 16. The stand-offs 32 provide a clearance fit to ensure isolation between the ring 16 and the casing (12 and 20).

In this way, orbital (transverse/radial and torsional deflections) as well as longitudinal deflections transferred from a shaft through the rear face 20 and front face 12 are damped in all directions. The ring 16 acts as a damped spring with the mass of the inertia ring 15 set thereon. Vibrations from the casing are damped by the damped spring-mass system created by the ring 16 and inertia ring 15.

Inertia ring 15 provides deflection limits on the ring 16 to prevent displacement (and stresses) from getting too large. These deflection limits are in the radial as well as longitudinal directions (the longitudinal direction being along the shaft passing through the ring 16). For example, as depicted in FIG. 4, a star-shaped opening 89 in inertia ring halves 14 and 18 provides clearance between ears 91 and an inside surface 93 of halves 14 and 18. When large deflections of inertia ring 15 are experienced the amplitude of such deflections is limited by contact between surfaces 93 and ears 91. Rear face 20 also includes ears 91 (not shown in the view of FIG. 4). It is preferable that metal to metal contact between ears 91 and surfaces 93 be avoided. In normal operations, no contact is made between the housing/casing and the inertia ring.

Since inertia ring 15 includes plate 28 where bolts 36 pass through holes 23 and secure halves 14 and 18, the ring 16 may be compressed between the inertia ring halves 14 and 18. A compression preload provides many advantages in dampening vibration, e.g., it permits flexibility in tuning the damper by increasing/adjusting the spring rate/durometer, increasing restoring force. Further, rear face 20 includes a portion of a channel 41, and front face 12 includes a corresponding portion of a channel 42. When assembled, a u-shaped channel is formed which receives and inner portion 39 of the ring 16. Contact between the ring 16 and the housings 12 and 20 is maintained by appropriate sizing of parts and by the encapsulation of ring 16 by inertia ring 15. Ring 16 is registered to fit in u-channel 41/42 onto the casings (12 and 20) to provide the damping of shaft vibration.

Advantageously, by providing the inertia ring 15 about the elastomer ring 16, larger forces (greater deflections) can be handled and better response times are provided by the damper 10 in accordance with the present principles.

Ring 16 may easily by removed and replaced without the need to replace the entire damper 10. Conventional dampers often include a rubber material bonded to pieces of metal. When the rubber begins to yield, the entire damper must be replaced in conventional systems.

Front face 12 and rear face 20 may have an outer surface 44 and 45, respectively adapted to receive and frictionally hold a pulley or belt (not shown).

An interchangeable hub 22 is fastened to the rear face 20 using fasteners 46 through holes 47 in the front face 12 and the rear face 20 into threaded holes 51 formed in hub 22. Hub 22 receives a shaft therein in its inner diameter 17. Hub 22 may be easily changed to permit the use of damper 10 in different applications.

Figure 5:
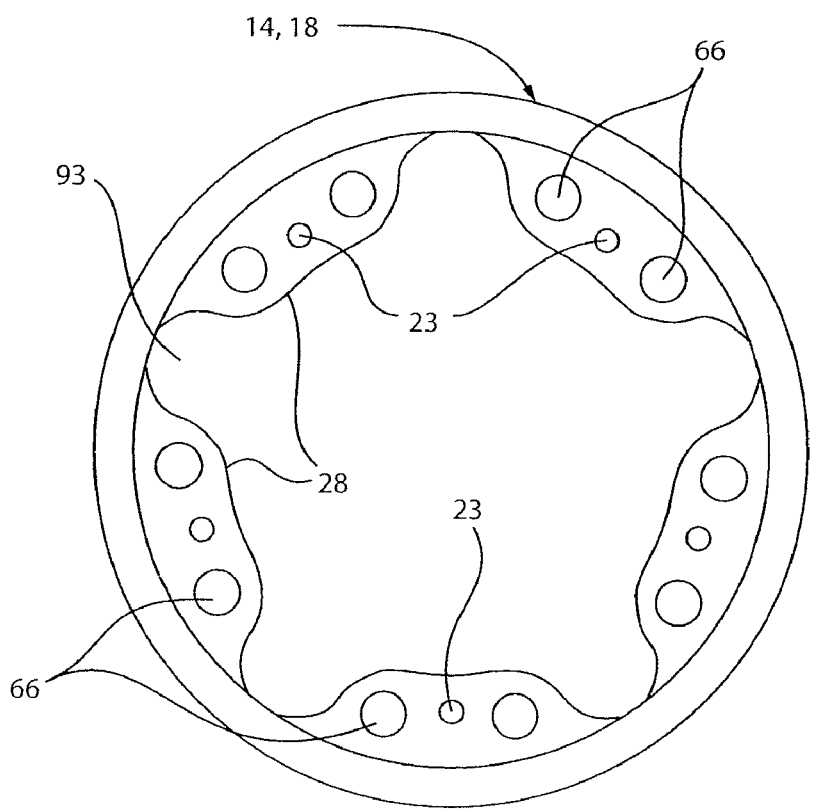
FIG. 5 is a front view of an inertia ring half showing hole patterns and openings therethrough.

Referring to FIG. 5, a front view of a front portion 14 (or rear portion 18) of inertia plate 15 is illustratively shown. Inertia plate portions 14 and 18 are symmetrical except that corresponding hole-patterns may be threaded in one and not the other to properly receive and secure bolts. Portion 14 includes extension plate 28 which is integrally formed with the inertia plate portions. Extension plates 28 may be different in number or reduced to smaller portions of the circumference if needed or desired. Plates 28, in this example, include two types of holes. These holes will be indicated as holes 66 and holes 23. Holes 66 are optionally formed to allow air to circulate through inertia ring halves 14 and 18 and ring 16. Bolts 36 which pass through the portion 14 through stand-off 32 in ring 16 and through portion 18 to be secured in rear face 20 (FIG. 3) pass through regions 93. Holes 23 receive bolts 35 and secure the elastomeric ring 16 to the inertia ring 15 (See FIG. 3).

Therefore, in this example, five bolts 35 pass through stand-offs 32 in the elastomer ring 16 to secure halves 14 and 18 of the inertia ring 15, and five bolts 36 pass through stand-offs 32 in the elastomer ring 16 through region 93 to secure the front plate 12 to the rear plate 20 (FIG. 3).

Holes 23 are threaded in one of portion 14 or portion 18. Bolts are received through one inertia plate portion (14 or 18), through a stand-off 32 in ring 16 and threaded into the other of portion 14 or 18. In this way, ring 16 is secured through standoffs 32 in a position within inertia plate 15. In this example, 5 bolts are employed to secure ring 16 to inertia ring 15, however a different number of bolts may be employed.

Figure 6:
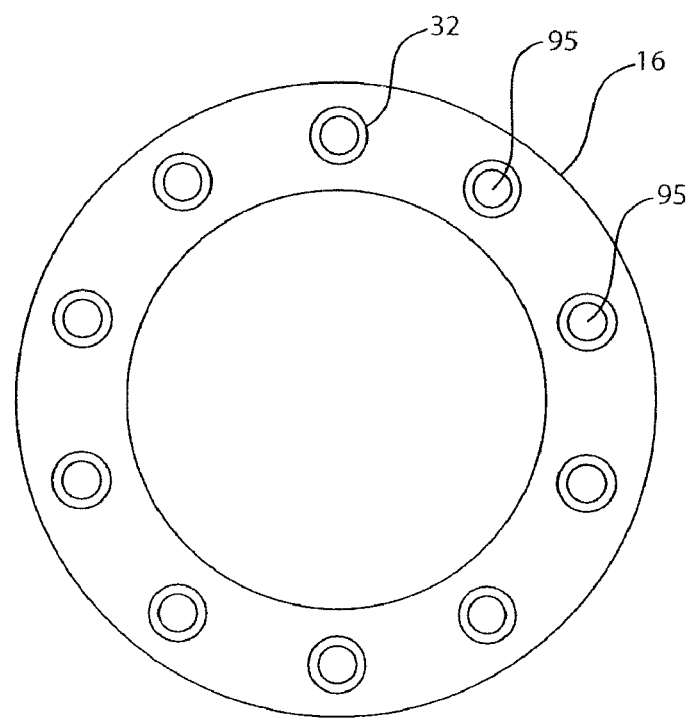
FIG. 6 illustrative depicts an elastomeric ring having standoffs disposed therethrough.

Referring to FIG. 6, elastomeric ring 16 is illustratively shown having stand-offs 32 in holes 95. Stand-offs 32 are located at ten positions in this example. Five of the ten positions receive bolts 35 and five of the ten positions receive bolts 36. Bolts 36 connect portions of inertia ring 15 through stand-offs of ring 16. Bolts 35 connect the front face 12 and the rear face 20 through stand-offs in ring 16. In a preferred embodiment, the bolts 35 and 36 alternate about the circumference of ring 16 to provide a uniformly spaced pattern. Other attachment patterns may also be employed.

Figure 7:
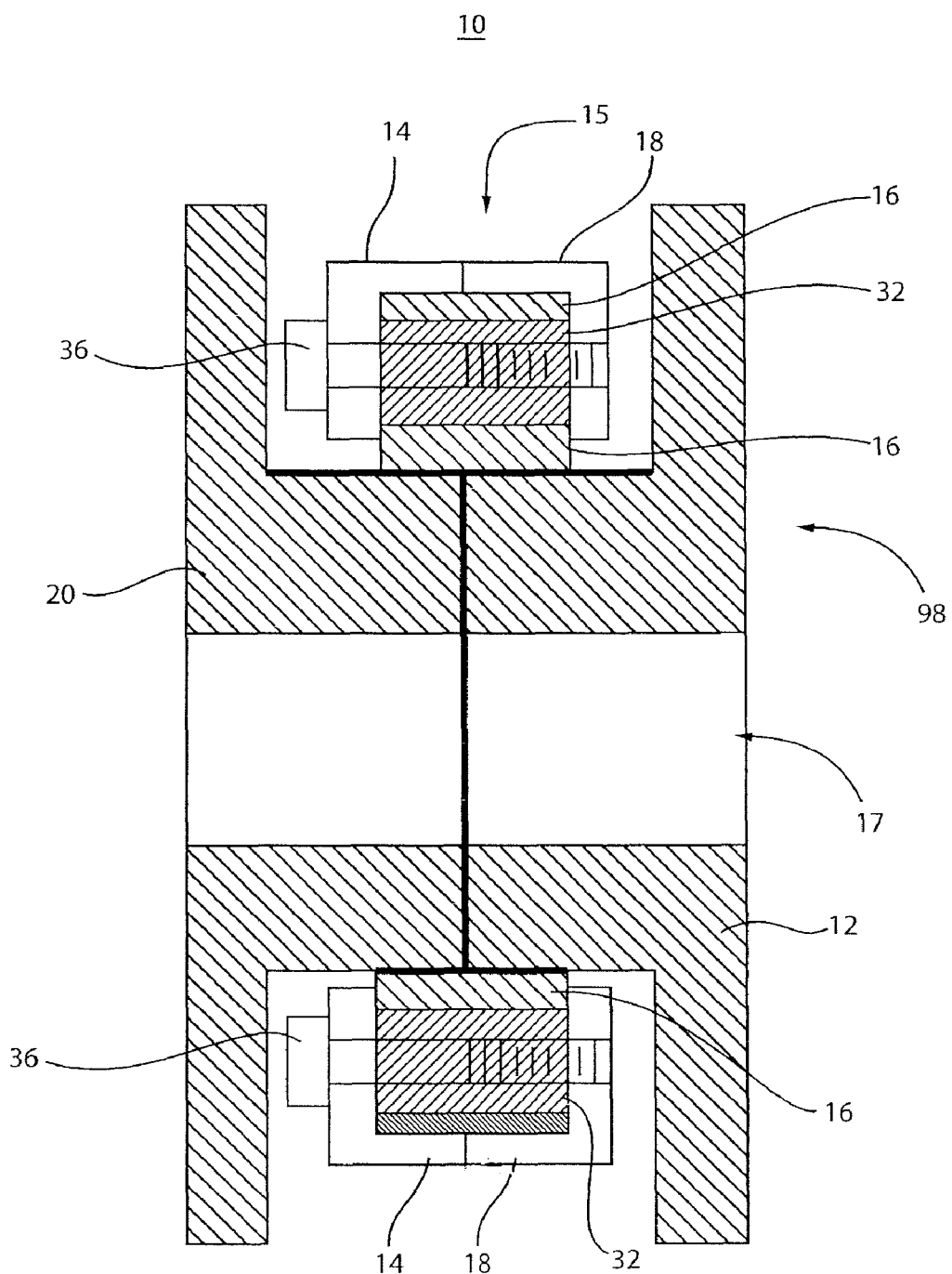
FIG. 7 is a schematic cross-sectional view showing an inertia ring floating on an elastomeric ring in accordance with present principles.

Referring to FIG. 7, elastomeric ring 16 is illustratively shown in a damper housing 98. Ring 16 includes stand-offs 32 having bolt holes through the stand-offs 32 to receive bolts 36 as illustratively described. Inertia ring 15 does not contact the housing formed by rear face 20 and front face 12. Instead, inertia ring 15 is supported by or floats on ring 16. Any vibrations or deflections experienced by housing 98 from a shaft (not shown) in a center hole 17 are damped by the damped spring-mass system formed by ring 16 and inertia ring 15.

Figure 8:
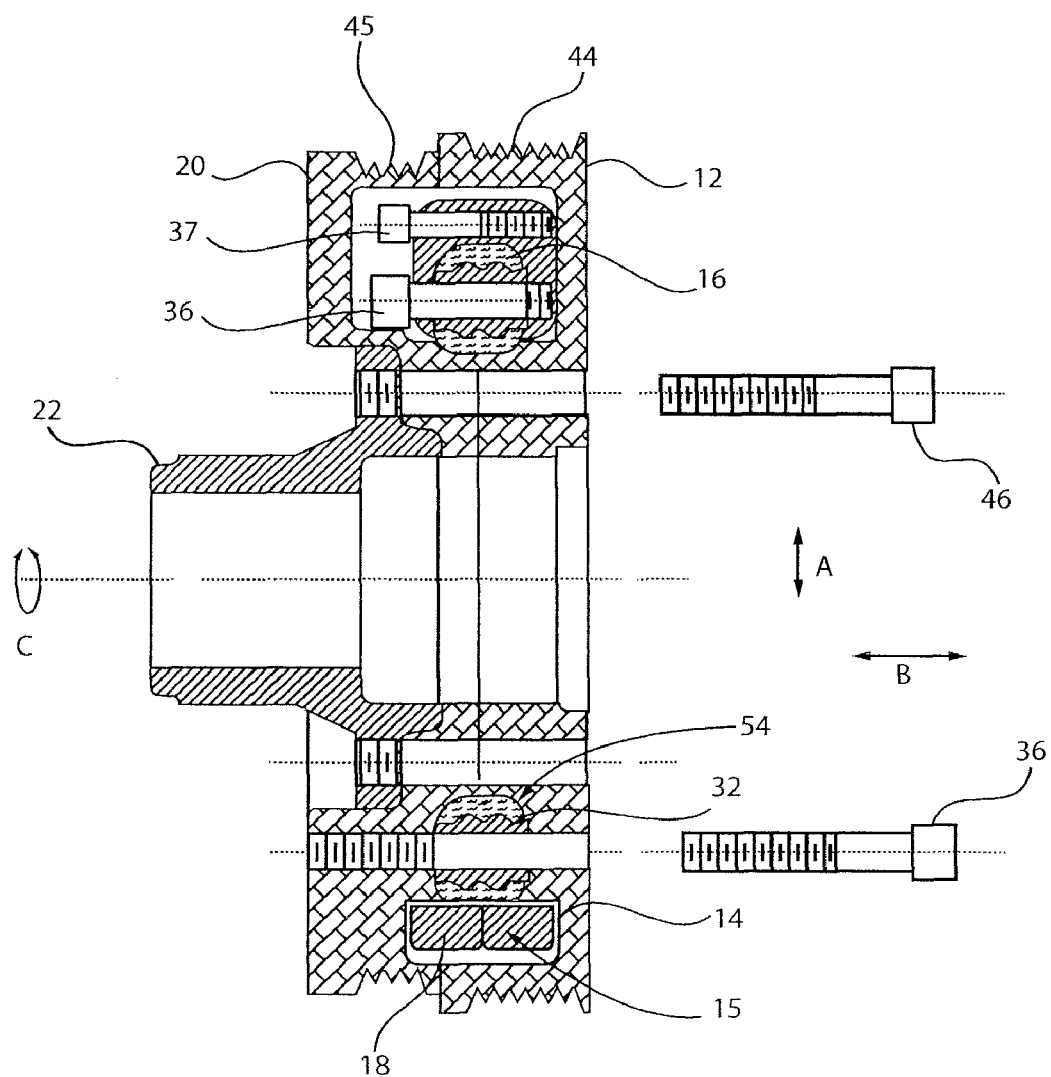
FIG. 8 is an assembled cross-sectional view of the damper of FIG. 2.

Referring to FIG. 8 with continued reference to FIG. 3, a cross-sectional view of the damper 10 is shown in an assembled state. Front face 12 and rear face 20 are additionally connected using bolts 46. Bolts 46 pass through front face 12 and rear face 20 and are threaded into hub 22. Hub 22 is dimensioned and configured to receive a shaft (not shown) such as a crankshaft, a drive shaft, or any other rotating shaft. When in an assembled position, ring 16 contacts a groove 54 formed at an interface of front face 12 and rear face 20. When the shaft imparts vibrations radially outward in the direction of arrow "A", longitudinally in the direction of arrow "B", and/or torsionally in the direction of arrow "C", or any combination thereof (e.g., orbital, etc.), ring 16 in channel 54 dampens the vibrations.

The resilience of the elastomeric material of ring 16 may be selected in accordance with the application (based on spring constant/durometer for dampening capabilities). Polyurethane is one preferred material since flexibility and resilience can be adjusted by varying its durometer, although other materials may be employed.

Figure 9:
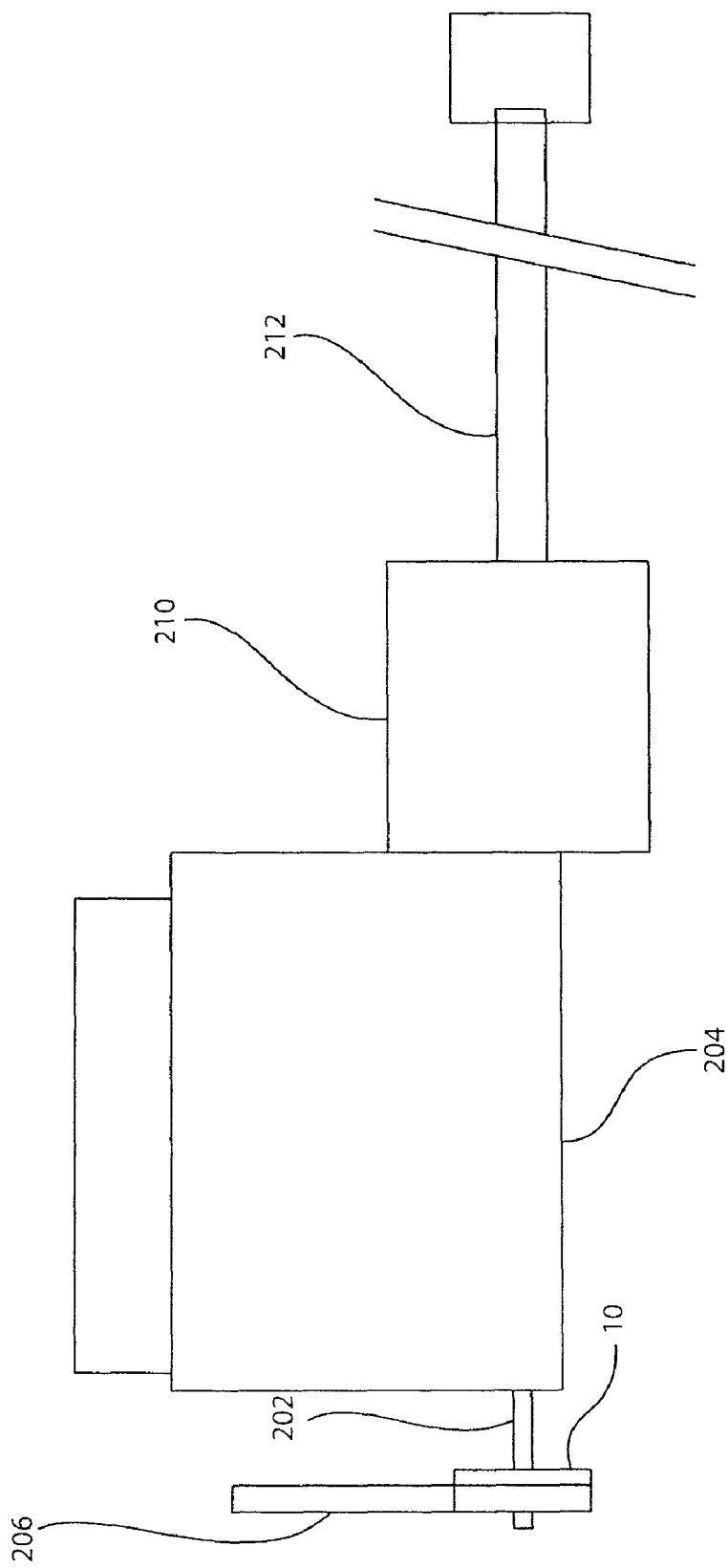
FIG. 9 is a schematic diagram showing a position of a damper on an engine in one illustrative application.

Referring to FIG. 9, in one illustrative embodiment, damper 10 includes a crankshaft damper employed on a crankshaft 202 of an internal combustion engine 204. A pulley or belt 206 may be mounted on damper 10 by forming a surface of the damper 10 to be compatible with the pulley 206. Pulley 206 may then be employed to drive other devices, such as an alternator, air conditioning compressor, etc. (not shown).

In other embodiments, damper 10 may be adapted to dampen vibrations in gears shafts or transmission 210 or dampen vibrations along a drive shaft 212. Other applications may include dampers for bearings for turbines, propellers or other rotating shafts or equipment.

The dampers in accordance with present principles are particularly useful in high performance engines where heavy vibrations and deflections are experienced. The damper material may be protected from the elements and or prepared for appearance by providing a plurality of finishes, e.g., anodizing, chrome or cadmium plating, powder coating, oxidizing, etc.

Having described preferred embodiments of a vibration damper (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A damper for shafts, comprising:
   an elastomeric ring;
   an inertia ring mounted on the elastomeric ring such that the elastomeric ring secures the inertia ring in a position; and
   a first housing portion engaging a second housing portion wherein the first and second housing portions form a u-channel wherein the u-channel abuts an inner portion of the elastomeric ring to maintain the inertia ring in the position such that the inertia ring floats on the elastomeric ring permitting motion in three dimensions responsive to mechanical disturbances without the inertia ring contacting the first and second housing portions.

2. The damper as recited in claim 1, wherein the first housing portion and the second housing portion form a hole for receiving a shaft.

3. The damper as recited in claim 2, wherein the hole through the first housing portion and the second housing portion receives an interchangeable hub for receiving the shaft.

4. The damper as recited in claim 1, wherein the first housing portion and the second housing portion faun a housing to receive one of a pulley and a belt.

5. The damper as recited in claim 1, wherein the elastomeric ring includes a plurality of holes through the elastomeric ring to receive stand-offs for bolts.

6. The damper as recited in claim 1, wherein the u-channel is formed at an engaging portion between the first housing portion and the second housing portion.

7. The damper as recited in claim 1, wherein the u-channel is formed such that the ring is concurrently supported by the first housing portion and the second housing portion.

8. The damper as recited in claim 1, wherein first fasteners and second fasteners are each evenly spaced about the elastomeric ring and the first and second fasteners alternate in positions about the elastic ring.

9. The damper as recited in claim 1, wherein the damper is configured to damp any of longitudinal deflections, torsional deflections, orbital deflections and radial deflections of a shaft through the first housing portion and the second housing portion.

10. A damper for shafts, comprising:
    an elastomeric ring having a plurality of holes therethrough, each hole having a stand-off disposed therein configured to receive a fastener therethrough;
    an inertia ring encapsulating the elastomeric ring and securing the elastomeric ring in a position, the inertia ring including plate portions and having openings corresponding to the stand-offs; and
    a first housing portion configured to receive first fasteners through the elastomeric ring through a first set of stand-offs and through openings in the inertia ring to connect the first housing portion to a second housing portion wherein the first and second housing portions form a u-channel wherein the u-channel abuts an inner portion of the elastomeric ring to bias the inertia in the position such that the inertia ring floats on the elastomeric ring permitting motion in three dimensions responsive to mechanical disturbances without the inertia ring contacting the first and second housing portions.

11. The damper as recited in claim 10, wherein the first housing portion and the second housing portion form a hole for receiving a shaft.

12. The damper as recited in claim 11, wherein the hole through the first housing portion and the second housing portion receives an interchangeable hub for receiving the shaft.

13. The damper as recited in claim 10, wherein the first housing portion and the second housing portion form a housing to receive one of a pulley and a belt.

14. The damper as recited in claim 10, wherein the first fasteners to the first housing portion include bolts evenly spaced about the elastomeric ring.

15. The damper as recited in claim 10, wherein the two portions of the inertia ring are connected by second fasteners through the openings in the elastomeric ring.

16. The damper as recited in claim 15, wherein the first fasteners and second fasteners are each evenly spaced about the elastomeric ring and the first and second fasteners alternate in positions about the elastic ring.

17. The damper as recited in claim 10, wherein the damper is configured to damp any of longitudinal deflections, torsional deflections, orbital deflections and radial deflections of a shaft through the first housing portion and the second housing portion.

18. A crankshaft damper, comprising:
   a polyurethane ring having a plurality of holes therethrough, each hole having a stand-off disposed therein configured to receive a fastener therethrough;
   an inertia ring having two portions such that the portions encapsulate the elastomeric ring and secure the elastomeric ring in a position, the inertia ring including plate portions and having openings corresponding to the stand-offs;
   a first pulley housing portion configured to receive first fasteners through a first set of stand-offs in the polyurethane ring, the first fasteners passing through the polyurethane ring and openings in the inertia ring, the first pulley housing portion having an outside diameter configured to receive a belt; and
   a second pulley housing portion configured to receive the first fasteners and connect the first and second pulley housings, the second pulley housing portion having an outside diameter configured to receive a belt, wherein the first and second pulley housing portions form a channel to receive an inner portion of the elastomeric ring, the channel abutting the inner portion against a bottom and sides of the channel, the first pulley housing portion and the second pulley housing portion further forming a hole which receives an interchangeable hub for receiving a shaft, wherein the inertia ring floats on the elastomeric ring without the inertia ring contacting the first and second housing portions such that the polyurethane ring is configured to damp any of longitudinal deflections, torsional deflections, orbital deflections and radial deflections of the shaft.

19. The damper as recited in claim 18, wherein the first fasteners through the first set of stand-offs include bolts evenly spaced about the elastomeric ring.

20. The damper as recited in claim 19, wherein the first fasteners and second fasteners are each evenly spaced about the elastomeric ring and the first and second fasteners alternate in positions about the elastic ring.

* * * * *

UNITED STATES PATENT AND TRADEMARK OFFICE
CERTIFICATE OF CORRECTION

PATENT NO. : 8,015,897 B2
APPLICATION NO. : 11/525311
DATED : September 13, 2011
INVENTOR(S) : Douglas Dean Fisher It is certified that error appears in the above-identified patent and that said Letters Patent is hereby corrected as shown below:

Column 6, Line 26: In claim 4, please delete "faun" and add "form".

Signed and Sealed this
Twenty-second Day of May, 2012

David J. Kappos
*Director of the United States Patent and Trademark Office*